United States Patent [19]

Strauber et al.

[11] Patent Number: 5,012,774

[45] Date of Patent: May 7, 1991

[54] DEVICE FOR THE RELATIVE ANGULAR ADJUSTMENT OF A CAMSHAFT

[75] Inventors: Hans-Jürgen Strauber, Stuttgart; Robert Niklas; Rolf Ohlendorf, both of Weinstadt; Wolfgang Speier, Tübingen, all of Fed. Rep. of Germany

[73] Assignee: Daimler-Benz AG, Fed. Rep. of Germany

[21] Appl. No.: 486,933

[22] Filed: Mar. 1, 1990

[30] Foreign Application Priority Data

Mar. 4, 1989 [DE] Fed. Rep. of Germany ....... 3907077

[51] Int. Cl.⁵ .................... F01L 1/34; F01L 1/46
[52] U.S. Cl. .................. 123/90.17; 123/90.31
[58] Field of Search ............ 123/90.11, 90.12, 90.15, 123/90.17, 90.31

[56] References Cited

U.S. PATENT DOCUMENTS

| | | | |
|---|---|---|---|
| 3,978,829 | 9/1976 | Takahashi et al. | 123/90.15 |
| 4,231,330 | 11/1980 | Garcea | 123/90.15 |
| 4,494,496 | 1/1985 | Nakamura et al. | 123/90.15 |
| 4,811,698 | 3/1989 | Akasaka et al. | 123/90.17 |
| 4,841,924 | 6/1989 | Hampton et al. | 123/90.15 |
| 4,889,086 | 12/1989 | Scapecchi et al. | 123/90.31 |
| 4,895,113 | 1/1990 | Speier et al. | 123/90.17 |
| 4,903,650 | 2/1990 | Ohlendorf et al. | 123/90.17 |

FOREIGN PATENT DOCUMENTS

| | | |
|---|---|---|
| 3316162 | 11/1983 | Fed. Rep. of Germany . |
| 3247916 | 6/1984 | Fed. Rep. of Germany . |
| 0017214 | 1/1985 | Japan .................. 123/90.17 |
| 0134012 | 5/1989 | Japan .................. 123/90.17 |

*Primary Examiner*—David A. Okonsky
*Assistant Examiner*—Weilun Lo
*Attorney, Agent, or Firm*—Evenson, Wands, Edwards, Lenahan & McKeown

[57] ABSTRACT

The invention relates to a device for angularly adjusting an internal combustion engine camshaft in relation to a crankshaft and comprises an adjusting bushing connected to the camshaft, with an input sleeve surrounding said bushing, and with an actuator displaceably arranged there between. An input sleeve, the actuator, and the adjusting bushing are each provided with helical gear teeth to translate axial shifting of the actuator into relative rotation between the camshaft and crankshaft. In order to prevent rattling noises in the gear teeth that are caused by changing moments in the drive of the camshaft, the actuator is guided in stop-free fashion. A stop, which is effective between the input sleeve and camshaft, limits the angular adjustment so that the actuator is stressed between the input sleeve and camshaft to avoid backlash during rattling.

6 Claims, 1 Drawing Sheet

DEVICE FOR THE RELATIVE ANGULAR ADJUSTMENT OF A CAMSHAFT

BACKGROUND AND SUMMARY OF THE INVENTION

The invention relates to a device for the relative angular adjustment of an internal combustion engine camshaft in relation to its crankshaft wherein an adjusting bushing is rotationally fixed on the input end of the camshaft and has external gear teeth. An input sleeve with internal gear teeth surrounds the adjusting bushing and is connected to an input gear. An actuator is displaceably arranged between the input sleeve and adjusting bushing and has double gear teeth, one in engagement with the internal gear teeth of the input sleeve and the other in engagement with the external gear teeth of the adjusting bushing and wherein at least one gear teeth pair is designed with helical teeth. A spring holds the actuator in an initial position and rotational movement of the camshaft is limited by a stop.

A device of this general construction is known from DE-OS 3,316,162. In this device, an actuation path of the actuator arranged between input sleeve and adjusting bushing is limited by stops. Here, the stops are effective between the actuator and adjoining components of the device. Due to this arrangement of the stops, stressing of the gear teeth between input sleeve and adjusting bush is not possible. This has the disadvantage that in the end positions of the actuator, rattling noises can occur in the gear teeth due to backlash arising from production tolerances.

An object on which the invention is based is to create a device for relative angular adjustment of a camshaft and crankshaft in which stressing is achieved in the gear teeth between an input sleeve and adjusting bushing in at least an end position of the actuator.

This object is achieved by virtue of having the stop mechanism act between the input sleeve and the adjusting bushing.

By shifting of the stop away from the actuator, the actuator can move in the gear teeth in a stop-free fashion in at least one adjustment direction. Limiting the adjusting movement in one end position is achieved by having the stop act between the input sleeve and camshaft. As a result, the actuator is pressed into the gear teeth of the input sleeve and camshaft, which are blocked with respect to one another by the stop when the actuator is moved into an end position under the pressure of a spring or some other control means, e.g. under the pressure of the lubricating oil from the lubricating oil circuit.

The backlash is bridged by virtue of the resulting stressing in the gear teeth and the occurrence of rattling noises is avoided in an advantageous manner.

It has been found that the rattling noises are strongest in the starting and idling phase of the internal combustion engine. In these operating phases, the adjusting device is in a so-called initial position, (i.e. the angular adjustment between input sleeve and camshaft is equal to zero and the camshaft is set to "retard") and the actuator is in an end position. To eliminate rattling noises in this initial position of the device, it is sufficient if the stop is effective between the input sleeve and camshaft. The actuator is stop-free in its corresponding other end position.

An embodiment of the stop which is space-saving as regards construction and favorable in terms of production is obtained by having the stop formed by at least one driving tooth arranged on the input sleeve to engage in a corresponding recess on a part of the camshaft, or vice versa. A clearance is provided between flanks of the driving tooth and contact faces of the recess. The angular clearance distance substantially corresponds to the angular adjustment of the camshaft. The adjusting bushing has a disc-shaped flange which is bolted to a corresponding counter-flange on the input end of the camshaft. The input sleeve is rotatably supported on an outer cylindrical surface of the flange and rests against a collar of the flange. The collar projects radially from the outer surface and the driving tooth engages (as an axial prolongation of the input sleeve) into an open edge of the recess provided on the collar.

Other objects, advantages and novel features of the present invention will become apparent from the following detailed description of the invention when considered in conjunction with the accompanying drawings.

DETAILED DESCRIPTION OF THE DRAWINGS

Figure 1:
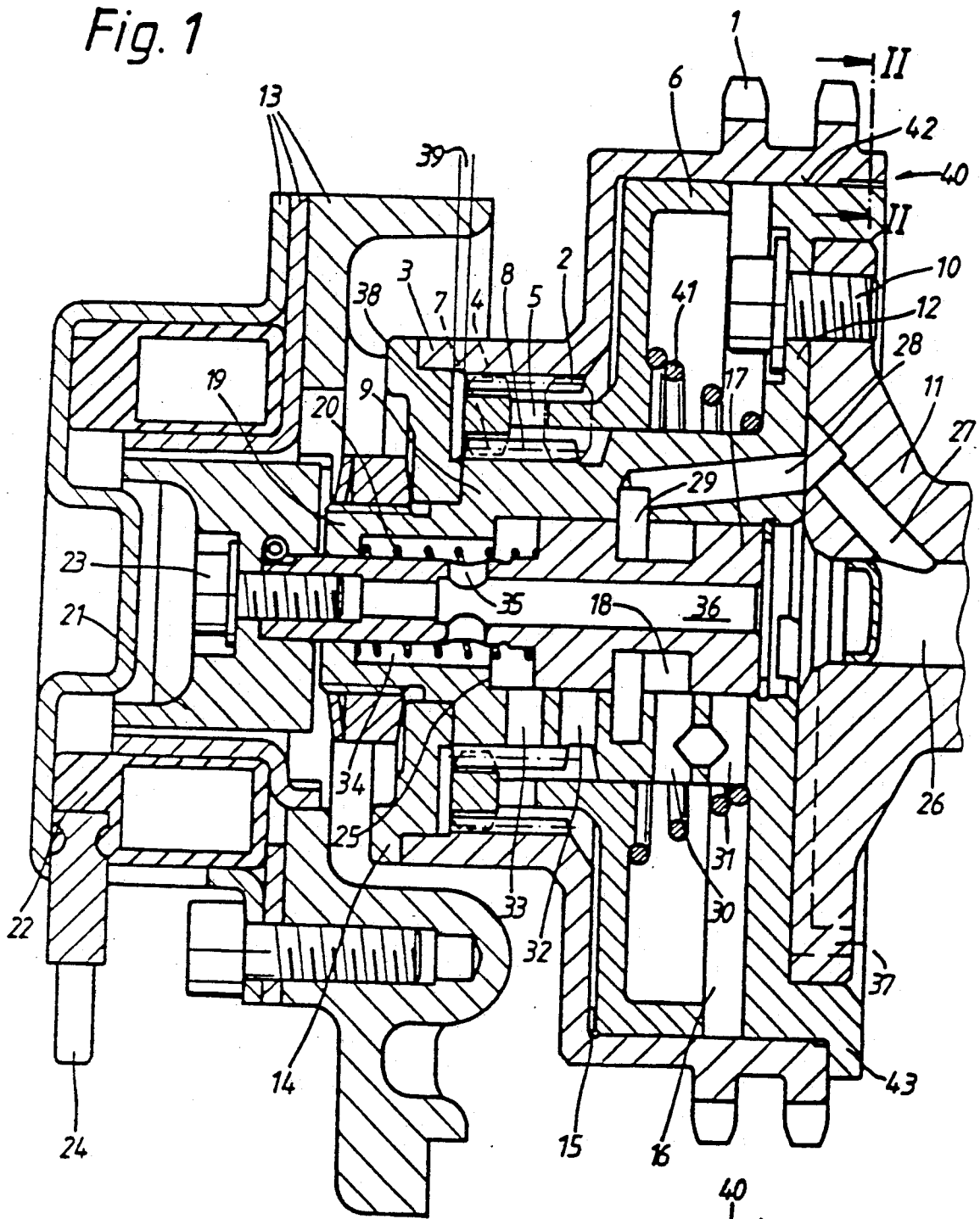
FIG. 1 shows the device for the angular adjustment of the camshaft in a longitudinal section.

FIG. 1 shows a device for the angular adjustment of a camshaft in relation to a crankshaft driving the latter. An input gear 1 is driven via a chain (not shown) from a crankshaft (not shown) and is seated on an input sleeve 3 provided with internal gear teeth 2. An annular actuator 6 is connected internally to the input sleeve 3 via corresponding external gear teeth 4 and is arranged so as to be axially displaceable and rotatable with respect to the input sleeve 3. On its inside, the actuator 6 has gear teeth 7 which are positively engaged with external gear teeth 8 on an adjusting bushing 9 so as to be axially displaceable and rotatable with respect to the busing. This adjusting bushing 9 has a flange 12 which is attached to a counter-flange of a camshaft 11 via a screwed connection 10. The input sleeve 3 is rotatably supported on a radial outward edge 43 of the flange 12, arranged at the camshaft end of the adjusting bushing 9, and on a cover 14 facing a crankcase part 13. Together, the cover 14, input sleeve 3, adjusting bushing 9 and camshaft 11 form an annular chamber, which is divided by longitudinally displaceable annular actuator 6 into two working chambers 15 and 16.

In order to achieve an angular displacement of the camshaft 11 with respect to the crankshaft, an axial displacement of the actuator 6 is necessary and is obtained by having at least one gear teeth pair 2,4 or 7,8 being designed with helical gear teeth. In the present example, both gear teeth pairs are provided with opposing helical gear teeth.

The division of the one necessary helical gear teeth set into the two helical gear teeth sets 2,4 and 7,8 shown, permits a reduction in the helix angle of each of the individual helical gear teeth sets necessary to obtain an identical longitudinal adjustment path. In this way it is possible to achieve a large range for the angular adjustment with a simultaneously short axial adjustment path. This allows for a short space-saving embodiment of the adjustment device.

A control piston 17 is inserted into the hollow adjusting bushing 9 and is rotatable and displaceable in the direction of its longitudinal axis. The piston has a circumferential oil groove 18 and is spring biased into an initial position toward the camshaft 11 by a spring 20 supported on one end 19 of the adjusting bushing 9 to bear against the piston 17. An armature 21 of an electromagnet 22 (fixed to the engine) is connected via a screwed connection 23 to the side of the control piston which faces away from the camshaft 11. The electromagnet 22 is designed as an annular magnet into which the armature 21 is inserted with freedom to rotate. The electromagnet is connected electrically to a control device (not shown) via a terminal 24. Upon application of an electric voltage to the electromagnet 22 by the control device, the rotating armature 21 is caused to move toward the electromagnet 22 and to carry the control piston 17, connected firmly to it and counter to the force of the spring 20, out of its initial position into a working position, in which the control piston 17 rests against a face 25 of the adjusting bushing 9. Face 25 of the adjusting bushing 9 is situated opposite its camshaft 11 end. The position of this face 25 is chosen so that the axial adjustment path of the control piston 17 is limited, so that in its working position, the armature 21 will not come into contact with a housing part of the electromagnet 22. In this way no friction occurs between the rotating armature 21 and the stationary housing 13 of the crankcase. The control piston 17 remains in this working position for as long as voltage is applied to the electromagnetic 22 and only returns to its initial position towards the camshaft 11 through force of the spring 20 once this voltage has been switched off.

In the de-energized condition of the electromagnet 22, the control piston 17 is held by the force of the spring 20 in its initial position. Lubricating oil passes under pressure from the engine oil circuit into the circumferential oil groove 18 of the control piston 17 via a longitudinal oil bore 26 in the camshaft 11, a connecting bore 27 and an oil bore 28, having a circumferential annular groove 29 in the flanged shaft. The adjusting bushing 9 has a radial oil feed bore 30 which leads to the first working chamber 16 and when the piston 17 is in its right-most position, the bore 30 is connected to the oil groove 18. The oil discharge bore 31 of the working chamber 16 is simultaneously closed by virtue of the position of the control piston 17. This results in the actuator 6 being brought by the oil pressure into its initial position, located away from the camshaft 11. Oil in the second working chamber 15 is unpressurized in this position, since the second oil feed bore 32 is closed by the control piston 17. The oil in chamber 15 can pass out of the working chamber 15, via the gear teeth set 2,4, the oil bore 5 in the actuator 6, the second gear teeth set 7,8 and a second, radial oil discharge bore 33 in the adjusting bushing 9 and into a longitudinal bore 36 of the control 17 via radial bores 35 and then through a channel 37, arranged in the camshaft 11, from whence it flows back to the engine oil circuit.

The adjustment of the device into the working position is initiated by the control device that actuates the electromagnet 22 to attract the armature 21 and the control piston 17 (counter to the force of the spring 20) until said control piston comes to rest with its shoulder against a face 25 of the adjusting bushing 9. Pressurized oil from the engine oil circuit passes out of the longitudinal oil bore 26 of the camshaft 11 and into the circumferential oil groove 18 of the control piston 17. Due to the changed position of the control piston 17, the oil feed bore 30 leading to the working chamber 16 is closed but oil discharge bore 31 is open. During the adjustment movement of the actuator 6, oil in working chamber 16 can be forced out via this bore 31 and a control piston chamber 36 on the camshaft side into the channel 37 and be passed back to the engine oil circuit. Also the drain of oil from the second working chamber 15 via the longitudinal bore 36, the radial bores 35 and the control piston 17 is rendered impossible by the position of the control piston 17. The pressurized oil passes out of the circumferential oil groove 18, via the open second oil feed bore 32 leading to the oil bore 5 of the actuator 6 and into working chamber 15. During this procedure, the actuator 6 is displaced axially towards the camshaft 11 and, as described above, forces oil out of working chamber 16. Due to the helical gear teeth sets 2,4 and 7,8 the bushing 19 and camshaft 11, connected thereto, undergo a relative rotation in relation to the driven input gear 1 during the longitudinal displacement of the actuator 6. However, this working position of the actuator 6 is only retained for as long as the electromagnet 22 is supplied with voltage via the control device. When the electromagnet 22 is switched off, the control piston 17 is pushed into its initial position according to FIG. 1 by the spring 20 and the rotation of the camshaft 11 is reversed so as to be moved into its initial position by the renewed longitudinal displacement of the actuator 6 and the consequent rotation of the bushing 9.

The cover 14 has a recess 38 on its side facing the actuator 6. This provides a gap 39 between the end of the gear teeth sets 2,4 or 7,8 and the cover 14, by virtue of which the actuator 6 can be moved in stop-free fashion when moved out of the working position (illustrated) into the initial position drawn in chain-dotted lines. In the initial position, the angular adjustment between input gear 1 and camshaft 11 is equal to zero. This position between input gear 1 and camshaft 11 is blocked by a stop 40, which is effective between the adjusting bushing 9 and the input sleeve 3. The stop 40 simultaneously prevents a further movement of the actuator 6 in the direction of the cover 14 and the rotation of the gear teeth. However by virtue of the gap 39, the actuator 6 can (in the initial position) be pressed into the gear teeth by the control medium in working chamber 16 until any backlash present is bridged and stressing between the tooth flanks is achieve. Thus occurrence of rattling noises is thereby excluded.

In the starting and idling phase, the device is in the initial position shown in FIG. 1. In the starting phase, the control pressure in working chamber 16 is still not sufficiently high to be able to force the actuator 6 into the gear teeth.

To compensate for this lack of control pressure, a compression spring 41 is arranged in working chamber 16 to bias the rotor 6 to the left. Spring 41 is supported on the adjusting bushing 9 and on the actuator 6 to press the actuator 6 into the gear teeth. Thus it is ensured that rattling of the device is avoided even in the starting phase. Since according to the embodiment in FIG. 1, the actuator 6 is displaced into the initial and working position by means of the control medium, the spring 41 is designed in such a way that its thrust is just sufficient to hold the actuator 6 in the initial position.

The input sleeve 3, rotatably supported on a cylindrical outer surface 42 of the flange 12 of the adjusting bushing 9, is guided in the axial direction between the cover 14 and a collar 43 projecting radially from the outer surface 42 of the flange 12.

Figure 2:
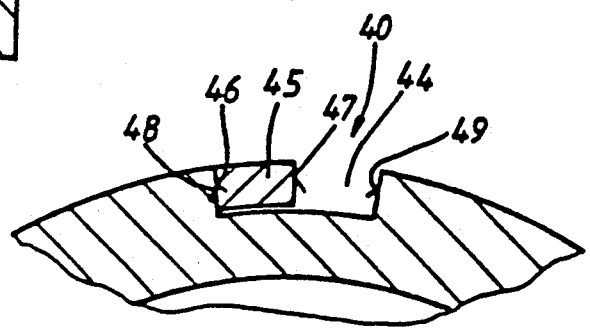
FIG. 2 shows the arrangement and design of the stop between input sleeve and camshaft, in a section II—II from FIG. 1.

According to FIG. 2, the stop 40 comprises a recess 44 in the collar 43 of the flange 12. The recess 44 is open at a radial edge and a driving tooth 45 on the input sleeve 3 engages thereinto. The driving tooth 45 is designed in simple manner as an axial extension of the input sleeve and has two end stop flanks 46 and 47. Stop flank 46 rests against a contact face 48 of the recess 44 in the initial position of the device. The width of the recess is of such a length that there is still a space corresponding to the angle of adjustment of the camshaft 11 between stop flank 47 and an opposite contact face 49 of the recess 44. As a result, the actuator 6 is fixed by the stop 40 even in the working position and can thus be held in stop-free fashion even in this position. By means of this stop 40, it is possible to prevent rattling noises which occur in the initial and working position.

To prevent the noises, it is sufficient, within the context of the invention, if the actuator 6 is only held in stop-free fashion in the initial position and if the stop 40 in the arrangement according to the invention is then designed in such a way that the input sleeve 3 and the camshaft are only blocked in the initial position.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A device for adjusting an angular position of an internal combustion engine camshaft in relation to the engine crankshaft comprising:
    an adjusting bushing which is rotationally fixed on an input end of the camshaft and has external gear teeth;
    an input sleeve connected to an input gear;
    said input sleeve surrounding the adjusting bushing and having internal gear teeth;
    an actuator displaceably arranged between the input sleeve and the adjusting bushing to be displaced from an initial position to a working position;
    said actuator having two sets of gear teeth, one set in engagement with the internal gear teeth of the input sleeve and the other set in engagement with the external gear teeth of the adjusting bushing;
    wherein at least one of said engaging gear teeth is designed as helical teeth;
    a spring means for holding the actuator in its initial position;
    wherein the rotational adjustment of the camshaft is limited by a stop means; and
    wherein the stop means acts between the input sleeve and the adjusting bushing.

2. Device according to claim 1 wherein the stop is formed by at least one driving tooth arranged on the input sleeve to engage in a corresponding recess on a part of the adjusting bushing;
    wherein the driving tooth has two flanks;
    wherein there is a clearance provided between the flanks and contact faces of the recess;
    and wherein said clearance is of an angular distance substantially corresponding to the angular adjustment of the camshaft.

3. Device according to claim 1 wherein the stop is formed by at least one driving tooth arranged on the adjusting bushing to engage in a corresponding recess on a part of the input sleeve;
    wherein the driving tooth has two flanks;
    wherein there is a clearance provided between the flanks and contact faces of the recess; and
    wherein said clearance is of an angular distance substantially corresponding to the angular adjustment of the camshaft.

4. Device according to claim 1, wherein the rotational fixing of the adjusting bushing to the camshaft is provided by a disc-shaped flange formed by the adjustable bushing which is bolted to a corresponding counter-flange on the input end of the camshaft;
    wherein the input sleeve is rotatably supported on an outer cylindrical surface of the flange and rests against a collar of the flange;
    wherein said collar projects radially from the outer surface;
    wherein the stop means is a driving tooth formed by an axial prolongation of the input sleeve to engage into the recess provided on the collar; and
    wherein said recess is open at an edge to allow for engagement of the driving tooth.

5. Device according to claim 2, wherein the rotational fixing of the adjusting bushing to the camshaft is provided by a disc-shaped flange formed by the adjustable bushing which is bolted to a corresponding counter-flange on the input end of the camshaft;
    wherein the input sleeve is rotatably supported on an outer cylindrical surface of the flange and rests against a collar of the flange;
    wherein said collar projects radially from the outer surface;
    wherein the driving tooth is formed by an axial prolongation of the input sleeve to engage into the recess provided on the collar; and
    wherein said recess is open at an edge to allow for engagement of the driving tooth.

6. Device according to claim 3, wherein the rotational fixing of the adjustment bushing to the camshaft is provided by a disc-shaped flange portion of the adjustable bushing which is bolted to a corresponding counter-flange on the input end of the camshaft;
    wherein the input sleeve is rotatably supported on an outer cylindrical surface of the flange and rests against a collar of the flange;
    wherein said collar projects radially from the outer surface;
    wherein the driving tooth is formed by an axial prolongation of the adjusting bushing to engage into the recess provided on the input sleeve; and
    wherein said recess is open at an edge to allow for engagement of the driving tooth.

* * * * *